Patented June 8, 1926.

1,587,866

UNITED STATES PATENT OFFICE.

WALTER SCHOELLER, OF BERLIN-WESTEND, AND KURT SCHMIDT, OF BERLIN-FRIEDENAU, GERMANY, ASSIGNORS TO CHEMISCHE FABRIK AUF ACTIEN (VORM. E. SCHERING), OF BERLIN, GERMANY.

MONOIODO-OXINDOL AND PROCESS OF MAKING SAME.

No Drawing. Application filed November 24, 1925, Serial No. 71,216, and in Germany December 10, 1924.

An iodo-oxindol has not up to the present been produced by the direct iodination of oxindol. When iodination is effected with potassium iodide or potassium iodate or by the direct action of iodine, dark brown greasy masses are obtained which contain the iodine quite loosely bound and not in the nucleus.

We have succeeded against all expectations in obtaining a good yield of an iodo-oxindol substituted in the nucleus when according to this invention iodine chloride is caused to react upon oxindol, preferably in a concentrated mineral acid solution.

Example.

To 4.5 grams of oxindol, dissolve in 100 ccm. concentrated hydrochloric acid is added a solution of 10 grams iodine chloride and 50 ccm. concentrated hydrochloric acid and the mixture allowed to stand at room temperature for two hours. According to this example about one mole of oxindol is supplied for each two moles of iodine chloride, but it is not necessary to maintain this proportion, since even when other proportions are used, the monoiodo-oxindol is formed. The mixture is then poured into 3 litres of ice water. Cloudiness quickly sets in and there gradually precipitates a dark brown crystalline body. After standing for one day precipitation is complete. The residue is filtered off and steam distilled. The residue remaining in the flask is dissolved in very dilute caustic soda and the filtrate made acid with sulphurous acid. A reddish brown body separates out which becomes colourless and pure after recrystallization from 50 percent alcohol and boiling wth animal charcoal. The pure compound is of a slight red brown appearance, crystallizes in fascicular needles, decomposes at about 168° C. and by analysis is found to be a monoiodo-oxindol and corresponds to the following formula:—

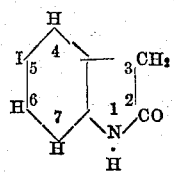

The compound is fairly soluble in acetic ester and glacial acetic acid but is again precipitated on the addition of a few drops of water; it is easily soluble with a red brown colouration in concentrated sulphuric acid, the iodine being only split off in any quantity on boiling.

The compound is useful for the manufacture of pharmaceutical preparations.

We wish it to be understood that the production of the new compound is not limited to the exact proportions and operations described, for obvious modifications will occur to a person skilled in the art.

We claim:—

1. As a new product the monoiodo-oxindol, being fairly soluble in acetic ester and glacial acetic acid, crystallizing in red brownish fascicular needles and decomposing at about 168° C.

2. The process of making monoiodo-oxindol which consists in causing iodine chloride to react upon oxinol.

3. The process of making monoiodo-oxindol which consists in causing iodine chloride to react upon oxindol in a concentrated mineral acid solution.

4. The process of making monoiodo-oxindol which consists in causing iodine chloride to react upon oxindol in a concentrated solution of hydrochloric acid.

5. The process of making monoiodo-oxindol which consists in causing iodine chloride to react upon oxindol in a concentrated mineral acid solution, pouring the mixture into ice water and purifying the precipitate.

In testimony whereof we affix our signatures.

WALTER SCHOELLER.
KURT SCHMIDT.